Figure 1:
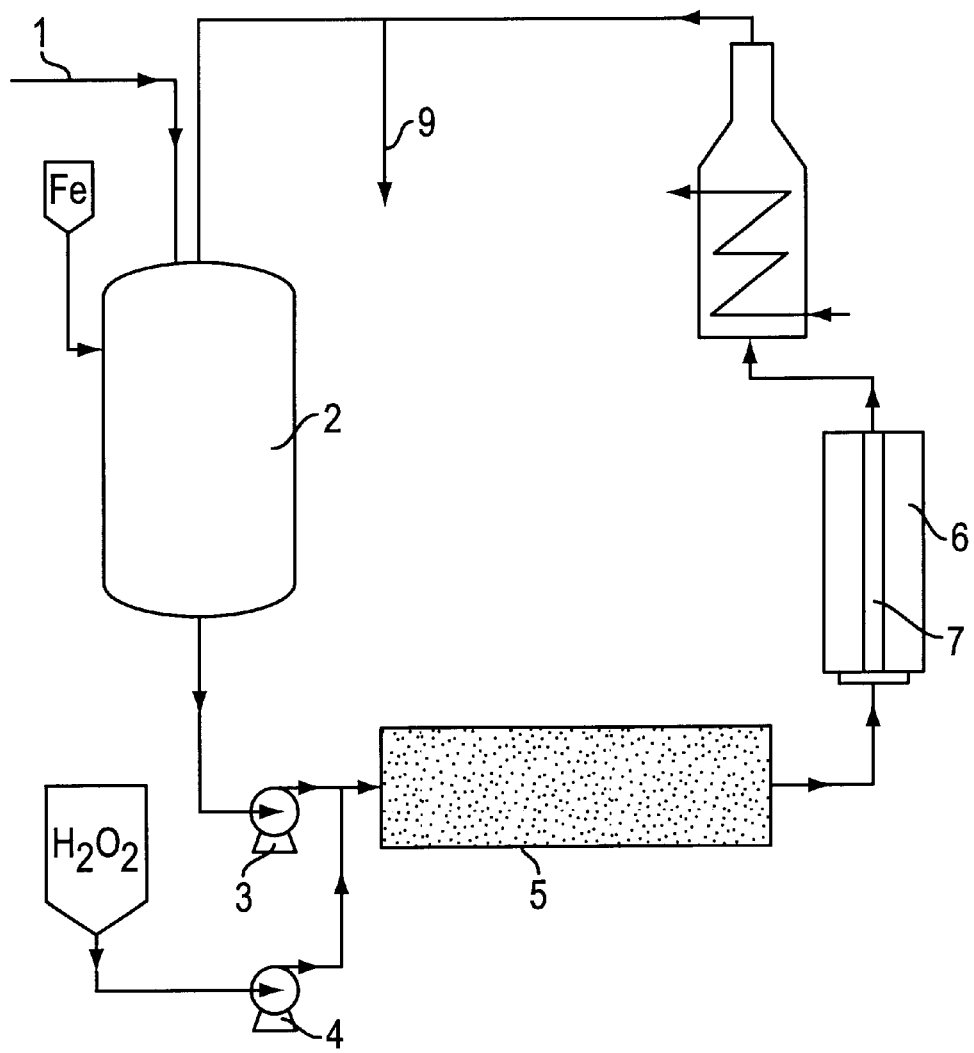

United States Patent
Pittroff et al.

[11] Patent Number: 6,083,398
[45] Date of Patent: Jul. 4, 2000

[54] PROCESS FOR THE DECOLORATION AND DETOXIFICATION OF AQUEOUS EFFLUENTS

[75] Inventors: Michael Pittroff, Hannover, Germany; Karl-Heinz Gregor, Mollem-Asse; Ludwich Bettens, Wetteren, both of Belgium

[73] Assignee: Solvay (Societe Anonyme), Brussels, Belgium

[21] Appl. No.: 08/979,790

[22] Filed: Nov. 26, 1997

[30] Foreign Application Priority Data

Dec. 2, 1996 [BE] Belgium .............................. 09601002
Nov. 17, 1997 [BE] Belgium .............................. 09700916

[51] Int. Cl.[7] ................................................ C02F 1/78
[52] U.S. Cl. .................. 210/626; 210/631; 210/748; 210/759; 210/760; 210/763; 210/917
[58] Field of Search ..................... 210/721, 631, 210/724, 748, 759, 760, 626, 917, 766, 763

[56] References Cited

U.S. PATENT DOCUMENTS 4,012,321 3/1977 Koubek .................................. 210/748
5,043,080 8/1991 Cater et al. .............................. 210/748
5,470,480 11/1995 Gray et al. .............................. 210/632
5,611,928 3/1997 Savolainen et al. ..................... 210/631

FOREIGN PATENT DOCUMENTS 3933511 4/1991 Germany.
61197093 9/1986 Japan.

OTHER PUBLICATIONS

W.G. Kuo: "Decolorizing Dye Wastewater with Fenton's Reagent". In: Water Research, vol. 26, No. 7, Jul. 1, 1992, pp. 881–886.

G. Ruppert et al.: "UV–03, UV–H203, UV–Ti02 and the Photo–Fenton Reaction . . . ". In: Chemosphere, vol. 28, No. 8, 1994, pp. 1447–1454.

Primary Examiner—Peter A. Hruskoci
Attorney, Agent, or Firm—Venable

[57] ABSTRACT

Process for the decoloration and the toxification of highly polluted (COD≧1000 mg/l) resistant aqueous effluents by an oxidation treatment of the effluents by hydrogen peroxide, continuously and in a homogeneous phase, at a pH of 2 to 5 in the presence of Fe ions and under irradiation by means of UV radiation. The AvOx/COD ratio by weight is not less than 0.5:1 and the AvOx/concentration of Fe ions ratio by weight is not less than 50:1.

12 Claims, 1 Drawing Sheet

PROCESS FOR THE DECOLORATION AND DETOXIFICATION OF AQUEOUS EFFLUENTS

The invention relates to a process for the decoloration and the detoxification of aqueous liquid waste and in particular of aqueous industrial discharges by an oxidizing chemical treatment.

More particularly, it relates to a process for the decoloration and the detoxification of industrial aqueous effluents containing dyes and toxic organic compounds, which are resistant to conventional pollution-abatement chemical treatments, by treatment by means of peroxygenated compounds in the presence of ultraviolet radiation.

Many industrial operations, such as the textile industry, the paper, cardboard and plastic packaging industry, the leather industry, and the like, produce highly polluted aqueous discharges containing a great variety of dyes and of organic products which are toxic to living creatures, among which are found intensely coloured compounds and/or compounds which are resistant to the majority of known chemical pollution-abatement treatments. The colouring of the effluents cannot be removed by a biological treatment. Moreover, the high toxicity of these discharges generally does not allow them to be treated in a biological operation by means of activated sludges, or even to be mixed, even in small proportions, with other effluents which would only contain organic substrates which are nontoxic for the biomass.

A process for treating groundwaters and liquid effluents containing organic contaminants is known from U.S. Pat. No. 5,043,080, according to which the water is treated at a pH of approximately 2 to 4 with hydrogen peroxide in the presence of an ion of a transition metal, such as Fe or Cu, and irradiation is carried out with polychromatic ultraviolet light with wavelengths of 200 to 400 nm. In this process, $H_2O_2$ concentrations of 100 ppm, with $[H_2O_2]$/metal ions ratios by weight of 10:1 to 1:1, and concentrations of polluting organic materials of 100 ppm of dioxane, of 100 ppm of trinitrotoluene and of a mixture of 8 ppm of benzene, 7 ppm of toluene and 4 ppm of xylene are disclosed. Patent U.S. Pat. No. 5,043,080 does not, however, deal with the problem of the decoloration and of the detoxification of resistant effluents containing a high load of pollutants, such as the effluents encountered in the industries mentioned above.

This known process, moreover, exhibits the disadvantage of bringing about precipitation of insoluble metal compounds on the transparent walls of the ultra-violet lamps and, for this reason, of rapidly decreasing the efficiency thereof.

The invention overcomes the disadvantages of the known processes by providing an efficient process for the treatment of highly polluted effluents which does not affect the transparency of the walls of UV lamps and which makes it possible to continue the purification treatment by means of a biochemical stage, without endangering the viability of the biomass.

To this end, the invention relates to a process for the decoloration and the detoxification of aqueous effluents by an oxidation treatment of the effluents by hydrogen peroxide, continuously and in a homogeneous phase, at a pH of 2 to 5 in the presence of Fe ions and under irradiation by means of UV radiation, characterized in that:

a) the effluent to be treated is coloured and resistant and highly polluted and exhibits a chemical oxygen demand (COD) of not less than 1000 mg/l, b) the ratio by weight of the concentration of active oxygen (AvOx) (expressed as mg oxygen/l) of the continuous homogeneous phase to the COD of the effluent (expressed as mg/l) is not less than 0.5:1, c) the ratio by weight of the AvOx of the continuous homogeneous phase (expressed as mg oxygen/l) to the concentration of Fe ions (expressed as mg Fe/l) is not less than 50:1.

Decoloration and detoxification of an effluent is understood to denote a purification treatment of this effluent which lowers its toxicity to a sufficient extent with respect to the biomass of the activated sludges which are used in biological purification processes for the viability of this biomass not to be compromised after several hours of contact with the detoxified effluent.

The treatment according to the invention is carried out in a homogeneous aqueous phase in the presence of Fe ions. Any water-soluble source of Fe ions is generally suitable. For example, it will be possible to employ water-soluble Fe salts of organic or inorganic acids. The oxidation state of the Fe ions employed is preferably the II state, although Fe(III) ions can also be used, in particular when their concentration does not exceed 20 mg/l.

Fe(II) oxalate can be employed but, however, is not recommended because of its not insignificant toxicity with respect to the biomass of the biological treatment which sometimes follows the detoxification treatment.

In practice, Fe salts of a strong inorganic acid, in particular Fe(II) salts, such as $FeCl_2$ and $FeSO_4$, are preferred. The sulphate $FeSO_4$ has given good results.

The concentration of Fe ions which is employed is generally not less than 5 mg/l and preferably not less than 10 mg/l. It often does not exceed 50 mg/l and, most often, does not exceed 40 mg/l. Concentrations of 10 and 20 mg/l have given excellent results.

The AvOx:concentration of Fe ions ratio by weight in the process according to the invention is preferably not greater than 1200:1. In a particularly preferred way, it does not exceed 1100:1.

It is also preferable to set the AvOx:COD ratio by weight at a value of not less than 1:1.

Likewise, it is preferable for the COD:concentration of Fe ions ratio by weight not to be greater than 1200:1.

In a particularly preferred way, this COD:concentration of Fe ions ratio is set at a value of not less than 50:1.

According to the invention, the UV radiation can be produced by any type of device available for operating in an industrial environment.

For example, the UV radiation can be produced by one or several mercury vapour lamps arranged so as to illuminate the entire volume of the homogeneous liquid phase of the reactor. It is possible, to this end, to use a lamp of elongate shape which is introduced into a quartz tube placed in the axis of a reactor of annular shape and to supply the mixture of effluent to be treated, of hydrogen peroxide and of Fe ions via one of the bases of the annular volume delimited by the quartz tube of the axis of the reactor and the outer cylindrical walls of the latter.

Mercury vapour UV lamps of the medium- and high-pressure type are preferably used. The spectrum of these lamps essentially lies in the UV at wavelengths ranging from approximately 210 to approximately 470 nm, in particular 254, 313 and 366 nm. These lamps also emit, at low intensity, radiation which lies in the visible region, that is to say in a wavelength range from approximately 470 to approximately 750 nm.

The power delivered by the UV radiation is generally greater than or equal to 200 W/l of illuminated homogeneous liquid phase to be treated. The power is in particular greater than or equal to 250 W/l of liquid phase, powers of not less than 260 W/l being the most common. The power is usually less than or equal to 350 W/l of liquid phase, in particular less than or equal to 300 W/l of liquid phase. The power generally lies in a range from 200 to 350 W/l of liquid phase. A power of 260 to 300 W/l of liquid phase has given excellent results.

The decoloration and detoxification treatment according to the invention is generally carried out at atmospheric pressure for reasons of ease and of reduced costs. However, there is no reason why the treatment according to the invention should not be carried out at pressures other than atmospheric pressure. It is possible, for example, to operate in a reactor which is overpressurized with respect to atmospheric pressure.

The temperature of the decoloration and detoxification treatment according to the invention is generally equal to or greater than the ambient temperature. It is preferable to use a temperature greater than the ambient temperature. Temperatures ranging from the ambient temperature to 80° C. can be used. Temperatures of not less than 50° C. and more particularly of not less than 60° C. are preferred. The temperature of 80° C. has given excellent results.

The duration of the decoloration and detoxification treatment according to the invention is generally greater than or equal to 5 min, in particular greater than or equal to 10 min. The duration is usually less than 120 min. Durations of less than or equal to 100 min are preferred. Durations greater than or equal to 5 min and less than 120 min are highly suitable.

The process according to the invention is advantageously carried out in the absence of enzyme.

In a specific embodiment of the process according to the invention, the oxidation treatment is carried out in the presence of ozone. The amount of ozone employed can vary from 5 g/l.h to 15 g/l.h. This embodiment leads to excellent results with respect to decoloration.

According to an alternative form of the process which is the subject of the invention, the detoxification treatment is followed by a biological purification treatment by means of an activated sludge. It is generally advisable to allow the effluents to cool to a temperature of less than 40° C. and preferably of less than 35° C., before bringing them into contact with the activated sludge.

According to another alternative form of the process which is the subject of the invention, the detoxification treatment is preceded by a biological purification treatment by means of an activated sludge.

These two alternative forms can optionally be combined.

The invention also relates to the application of the decoloration and detoxification process described above to the decoloration and the detoxification of industrial effluents. It relates in particular to the application of this process to the detoxification and to the decoloration of coloured effluents and of dye liquors from the textile industry.

FIG. 1 shows a plant used to carry out the instant process.

The following examples are given with the aim of illustrating the invention, without, for all that, limiting its scope thereof [sic].

EXAMPLE 1R (reference example not in accordance with the invention)

Ten liters of a dye liquor containing:
83.2 mg/l of Foron® yellow SEFL dye
208 mg/l of Foron® red dye
24.96 mg/l of Foron® blue dye
0.46 ml/l of Sandazol® KBN dispersant
0.46 ml/l of Lyogene® DFT dispersant
in solution in demineralized water was [sic] heated in a beaker for 5 minutes at 100° C.

The aqueous solution obtained is characteristic of effluents originating from dye liquors from the textile industry and is described by the following overall parameters:
COD: 1800 to 2000 mg/l
Extinction coefficient: 1.3 to 1.6
pH 3.5 (adjusted with sulphuric acid).

The effluent solution was introduced via the pipe 1 into the storage tank 2 of a laboratory-scale plant described in FIG. 1. The solution was then circulated for 10 minutes through the plant, the flow rate of the pump being adjusted to 6 l/min.

An amount of 15 g of $FeSO_4.7H_2O$ was then dissolved in the tank 2, so as to produce a COD:concentration of Fe(II) ratio of 1:0.2.

The solution is then recirculated through the plant for a period of 5 minutes, the flow rate of the pump being adjusted to 6 l/min, so as to distribute the Fe(II) content homogeneously throughout the liquid phase.

A 35% by weight concentrated hydrogen peroxide solution was then injected via the pump 4 with a flow rate of 0.5 ml/min at the inlet of the static mixer 5, after which the UV lamp 7 (HP lamp of TQ 2022 type manufactured by the firm W. C. Heraeus GmbH) equipping the reactor 6 was switched on. The electrical power supplied to the lamp was 1600 W and the volume of the reactor 3.5 l with an illuminated volume of 1.57 l. A total amount of 1.5–1.8 g of 100% $H_2O_2$ per liter of solution to be treated was thus added over a period of 78 minutes. The test was halted after running for 90 minutes.

Samples were withdrawn via the pipe 9, for the purposes of analysis, at the beginning of the test and after running for 15, 30, 45, 60 and 90 minutes. The temperature of the effluent rose during the test from 20 to 30° C., as a result of being heated during passage around the UV lamp.

| Duration of treatment, min | Reduction in the COD, % | Decoloration, % |
| --- | --- | --- |
| 0 | 0 | 0 |
| 15 | 37 | 28 |
| 30 | 70 | 32 |
| 45 | 71 | 57 |
| 60 | 72 | 16 |
| 90 | 70 | 8 |

The analyses were carried out according to the following standards:
COD: Hach method of the USEPA (US Environmental Protection Agency), Federal Registration, Vol. 45, 1980
Decoloration: measurement of extinction at 523 nm in a spectrophotometer equipped with a measuring cell with an optical path width of 1 cm.

EXAMPLE 2 (in accordance with the invention)

Example 1R was repeated in the same plant and with the same effluent, the temperature being modified to 80° C. and the amounts of Fe ions being modified so as to achieve the following ratios:
COD:AvOx of 1:0.5
AvOx:concentration of Fe ions of 100:1

| Duration of treatment, min | Reduction in the COD, % | Decoloration, % |
|---|---|---|
| 0 | 0 | 0 |
| 15 | 38 | 54 |
| 30 | 82 | 84 |
| 45 | 94 | 93 |
| 60 | 96 | 99 |

What is claimed is:

1. Process for the decoloration and the detoxification of aqueous effluents by an oxidation treatment of the effluents by hydrogen peroxide, continuously and in a homogeneous phase, at a pH of 2 to 5 in the presence of Fe ions and under irradiation by means of UV radiation, wherein
   a) the effluent to be treated is coloured and resistant and highly polluted and exhibits a chemical oxygen demand (COD) of not less than 100 mg/l,
   b) the ratio by weight of the concentration of active oxygen (AvOx) (expressed as mg oxygen/l) of the homogeneous phase to the COD of the effluent (expressed as mg/l) is not less than 0.5:1,
   c) the ratio by weight of the AvOx of the homogeneous phase (expressed as mg oxygen/l) to the concentration of Fe ions (expressed as mg Fe/l) is not less than 50:1; wherein the oxidation treatment is carried out at a temperature of 50 to 80° C.;

the concentration of Fe ions which is employed is not less than 5 mg/l and not greater than 50 mg/l; and the oxidation treatment is carried out for a duration of greater than or equal to 5 min and less than 120 min, to produce a treated effluent which exhibits a decoloration of at least 99%.

2. Process according to claim 1, characterized in that the AvOx:concentration of Fe ions ratio by weight is not greater than 1200:1.

3. Process according to claim 1, characterized in that the AvOx:COD ratio by weight is not less than 1:1.

4. Process according to claim 1, characterized in that the COD:concentration of Fe ions ratio by weight is not greater than 1200:1.

5. Process according to claim 1, characterized in that the COD:concentration of Fe ions ratio by weight is not less than 50:1.

6. Process according to claim 1, characterized in that the Fe ions are Fe(II) ions.

7. Process according to claim 1, characterized in that the decoloration and detoxification treatment is followed by a biological purification treatment by means of an activated sludge.

8. Process according to claim 1, characterized in that the UV radiation is produced by a medium- and high-pressure mercury vapour lamp delivering radiation with a spectrum extending from approximately 210 to approximately 470 nm and a power of not less than 200 W/l of illuminated effluent.

9. Process according to claim 1, characterized in that the oxidation treatment is carried out in the absence of enzyme.

10. Process according to claim 1, characterized in that the oxidation treatment is carried out in the presence of ozone.

11. Process according to claim 1, characterized in that the decoloration and detoxification treatment is preceded by a biological purification treatment by means of an activated sludge.

12. The process of claim 1, which further comprises detoxification and decoloration of an aqueous effluent which is from the textile industry and is selected from the group consisting of a colored effluent and dye liquor.

* * * * *

UNITED STATES PATENT AND TRADEMARK OFFICE
CERTIFICATE OF CORRECTION

PATENT NO. : 6,083,398
DATED : July 4, 2000
INVENTOR(S) : Michael PITROFF et al.

It is certified that error appears in the above-identified patent and that said Letters Patent is hereby corrected as shown below:

In Claim 1, in paragraph a), change "100" to --1000--.

Signed and Sealed this

Tenth Day of April, 2001

Attest:

NICHOLAS P. GODICI

Attesting Officer    Acting Director of the United States Patent and Trademark Office